Sept. 20, 1938.  L. M. LARSEN  2,130,984
CIGARETTE PACKAGE AND METHOD OF MAKING THE SAME
Filed Jan. 21, 1937
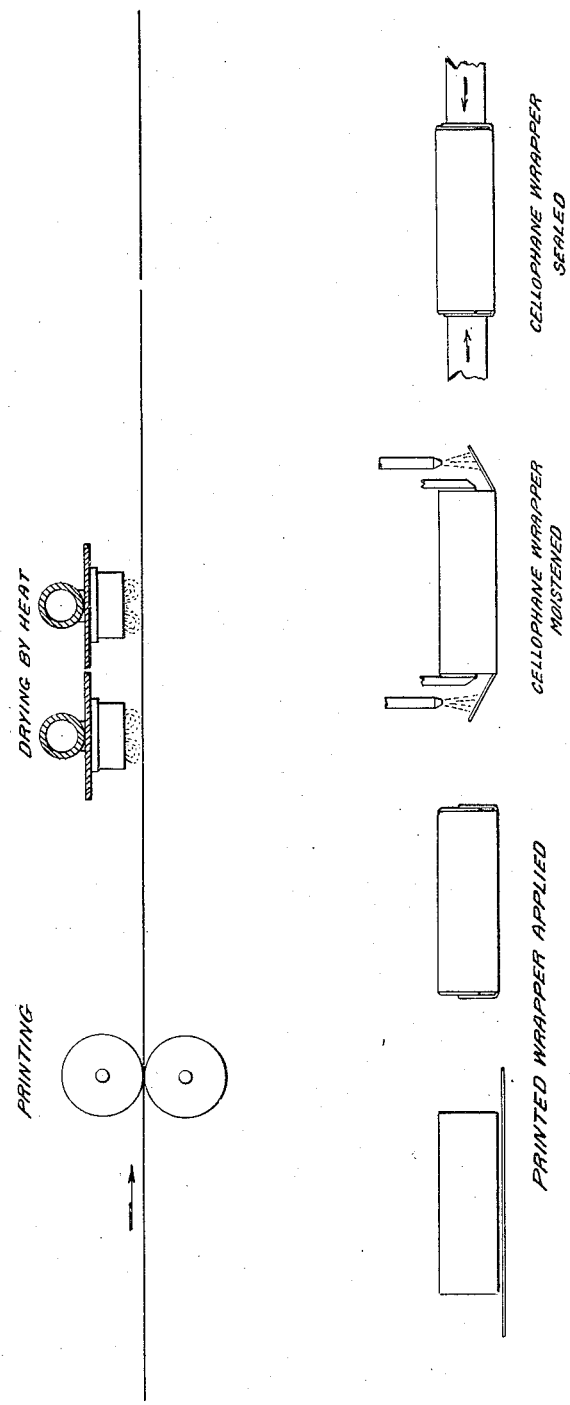
INVENTOR
LOUIS M. LARSEN
BY
Robert W. Byerly
ATTORNEY Patented Sept. 20, 1938

2,130,984

UNITED STATES PATENT OFFICE 2,130,984

CIGARETTE PACKAGE AND METHOD OF MAKING THE SAME

Louis M. Larsen, Rutherford, N. J., assignor to Interchemical Corporation, a corporation of Ohio Application January 21, 1937, Serial No. 121,560

1 Claim. (Cl. 93—2)

This invention relates to packages for cigarettes, and to a method of making the same.

It is now customary to enclose individual packages of cigarettes in "Cellophane" wrappers. The "Cellophane" is usually sealed at the ends of the packages, so as to prevent the penetration of moisture. When the packages are thus hermetically sealed, any odor which is present in the printed, inner wrapper tends to penetrate into the tobacco, and thus give the cigarettes an objectionable, foreign odor. The practice has been to subject the printed inner wrappers to extended drying periods in an attempt to completely remove any odor of the linseed oil vehicles of the printing inks. However, this is troublesome, expensive, time consuming and not always entirely successful, for traces of the odor tend to remain even after lengthy drying periods.

This disadvantage may be avoided by coloring the inner wrapper with a composition consisting of pigment, a normally solid binding material, and a volatile solvent for said binding material, the composition being free from drying oils which impart an objectionable odor to the contents of the package. However, the problem is complicated by the fact that in the usual method of sealing the "Cellophane" outer wrapper the binding material appears to be softened, thus smearing the color of the inner wrapper.

I have discovered that it is possible to avoid, on the one hand, the disadvantage of sealing odorous materials in the package, and on the other hand, the undesired smearing, by employing as the normally solid binding material, a binder which is soluble in the solvent of the coloring composition applied to the inner wrapper, and which is insoluble in solvents for "Cellophane". In the accompanying drawing there is illustrated diagrammatically a method according to the present invention. The binders which I have found to be particularly satisfactory are synthetic alkyd resins (made from phthalic anhydride, glycerine and a drying oil) and polymerized olefines. An example of the first type of resin is given below in the specific example; examples of the second type of resin are Santo resin, which is a resin obtained by polymerization of olefines obtained from petroleum products, such as cracked gasoline sludges, manufactured by Monsanto Chemical Corporation, and Vinsol resin, which is polymerized terpene hydrocarbon resin, manufactured by Hercules Powder Company.

The solvent which I prefer to employ is a petroleum fraction boiling between 270° C. and 315° C., and consisting of saturated, aliphatic hydrocarbons free from sulphur compounds and other substances having a disagreeable odor. Such solvents are of sufficiently low vapor pressure to permit printing of wrappers on ordinary typographic presses, without the ink drying on the press, and thus gumming the type. Another suitable solvent is butyl carbitol acetate.

In this manner, it is possible to heat the colored wrappers and thus rapidly drive off the solvent, so that the outer wrapper of "Cellophane" can at once be applied, all without the danger of sealing within the package any substances which might impart an objectionable odor to the tobacco. The coloring composition on the inner wrapper thus consists of a normally solid binder which secures the pigment to the paper, and which is not smeared during the sealing of the "Cellophane" outer jacket.

While I do not wish to be limited to any particular theory of operation, the present invention apparently obviates the tendency of solvents, such as methyl cellosolve, which are often employed to assist in sealing the "Cellophane", from attacking and softening the coloring composition on the inner wrapper.

By way of a specific example, I may employ a mixture of about 15 parts of pigment (carbon black and iron blue), about 2½ parts of cobalt dryer, about 20 parts of a resin such as Rezyl No. 1097–14, which is an alkyd resin made by American Cyanamide Company and about 20 parts of a solvent mixture containing equal parts of butyl carbitol acetate and a petroleum solvent such as that marketed by the Gulf Oil Company and having a boiling range of about 270°–305° C., known as mineral seal oil No. 896, all the parts being given by weight. The inner wrapper, which has been colored with this composition, may then be heated to rapidly drive off the volatilizable solvent, after which the paper may be made in the usual way, and the "Cellophane" wrappers applied, without the disadvantages mentioned.

By way of another example, I may employ a mixture of about 25 parts of suitable pigment, about 38 parts of Santo resin, about 38 parts of Absorbent Oil A, which is a highly refined petroleum distillate composed substantially entirely of saturated hydrocarbons and which is manufactured by the Atlantic Refining Company, and having a boiling range of 255° C.–300° C., and 1 part of "Syncera" wax, which is a nongranulating hydrocarbon wax.

It will be understood that the proportions and ingredients mentioned may be varied within the spirit of the invention.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

The method of manufacturing a cigarette package which comprises applying to an inner wrapper a coloring composition consisting of a pigment, a normally solid binder, and a volatilizable solvent, treating the wrapper thus produced to substantially completely eliminate the volatilizable solvent, applying a "Cellophane" wrapper to the package, and sealing the ends of the "Cellophane" wrapper with a solvent, said binder being substantially insoluble in said last-mentioned solvent.

LOUIS M. LARSEN.

CERTIFICATE OF CORRECTION.

Patent No. 2,130,984. September 20, 1938.

LOUIS M. LARSEN.

It is hereby certified that error appears in the printed specification of the above numbered patent requiring correction as follows: Page 1, second column, line 41, for the word "paper" read packages; and that the said Letters Patent should be read with this correction therein that the same may conform to the record of the case in the Patent Office.

Signed and sealed this 29th day of November, A. D. 1938.

Henry Van Arsdale (Seal) Acting Commissioner of Patents.